United States Patent
Gao et al.

(10) Patent No.: US 11,820,895 B2
(45) Date of Patent: Nov. 21, 2023

(54) PROCESS AND APPARATUS TO MAKE LIQUID SILICONE RUBBER COMPOSITIONS

(71) Applicant: DOW SILICONES CORPORATION, Midland, MI (US)

(72) Inventors: Jianjun Gao, Jiangsu (CN); Rainer Freudenberger, Schierstein (DE); Franz Heidenfelder, Schierstein (DE); Ruediger Siebmann, Schierstein (DE); Kalyn Froeschle, Midland, MI (US); Travis L. Clements, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 939 days.

(21) Appl. No.: 16/635,547

(22) PCT Filed: Jul. 31, 2018

(86) PCT No.: PCT/CN2018/000279
§ 371 (c)(1),
(2) Date: Jan. 30, 2020

(87) PCT Pub. No.: WO2019/024432
PCT Pub. Date: Feb. 7, 2019

(65) Prior Publication Data
US 2020/0255663 A1    Aug. 13, 2020

(30) Foreign Application Priority Data

Jul. 31, 2017  (WO) ................ PCT/CN2017/095152

(51) Int. Cl.
*C08L 83/04* (2006.01)
*B29C 48/03* (2019.01)
(Continued)

(52) U.S. Cl.
CPC ............. *C08L 83/04* (2013.01); *B29B 7/726* (2013.01); *B29B 7/728* (2013.01); *B29B 7/7495* (2013.01);
(Continued)

(58) Field of Classification Search
USPC .......................... 425/147; 428/447; 528/901
See application file for complete search history.

(56) References Cited

U.S. PATENT DOCUMENTS

| 4,659,621 A | * | 4/1987 | Finn | ................... G03G 15/2025 430/124.35 |
| 5,304,001 A | | 4/1994 | Kuo et al. | |

(Continued)

FOREIGN PATENT DOCUMENTS

| CN | 104470974 A | 3/2015 |
| CN | 210336692 U | 4/2020 |

(Continued)

OTHER PUBLICATIONS

Machine assisted English translation of JP2009191155A obtained from https://patents.google.com/patent on Mar. 15, 2023, 9 pages.
(Continued)

*Primary Examiner* — Fred M Teskin
(74) *Attorney, Agent, or Firm* — WARNER NORCROSS + JUDD LLP

(57) ABSTRACT

Provided are an assembly and process for the continuous or semi-continuous preparation of addition-crosslinking liquid silicone rubbers and to liquid silicone rubber compositions made therefrom. Also disclosed are articles made from the liquid silicone rubber compositions.

20 Claims, 1 Drawing Sheet

(51) Int. Cl.
    *B29B 7/72*      (2006.01)
    *B29B 7/74*      (2006.01)
    *B29B 7/86*      (2006.01)
    *C08G 77/06*    (2006.01)
    *B29K 83/00*    (2006.01)

(52) U.S. Cl.
    CPC ............... *B29B 7/86* (2013.01); *B29C 48/03* (2019.02); *C08G 77/06* (2013.01); *B29K 2083/005* (2013.01); *C08L 2312/08* (2013.01)

(56) References Cited

U.S. PATENT DOCUMENTS

| | | | |
|---|---|---|---|
| 5,403,089 | A | 4/1995 | Kuo et al. |
| 5,908,592 | A | 6/1999 | Kimura et al. |
| 5,989,719 | A * | 11/1999 | Loiselle ............... C08L 83/04 524/436 |
| 6,391,234 | B1 | 5/2002 | Silvi et al. |
| 2002/0074685 | A1 | 6/2002 | Boudreau et al. |
| 2004/0192809 | A1 | 9/2004 | Heisler et al. |
| 2007/0204912 | A1 | 9/2007 | Hanada et al. |
| 2008/0125528 | A1 | 5/2008 | Jerschow et al. |
| 2008/0200609 | A1 | 8/2008 | Woerner et al. |
| 2011/0200767 | A1 | 8/2011 | Uchida |
| 2011/0245426 | A1* | 10/2011 | Nabeta ............... C08L 83/04 525/209 |
| 2012/0080136 | A1 | 4/2012 | Schuler |
| 2015/0259585 | A1 | 9/2015 | Tasaki et al. |
| 2015/0298079 | A1 | 10/2015 | Normand |

FOREIGN PATENT DOCUMENTS

| | | |
|---|---|---|
| EP | 0832914 A2 | 4/1998 |
| EP | 0841363 A1 | 5/1998 |
| EP | 0909777 A2 | 4/1999 |
| EP | 1110691 A2 | 6/2001 |
| EP | 1203650 A1 | 5/2002 |
| EP | 1217042 A1 | 6/2002 |
| EP | 1537908 A1 | 6/2005 |
| EP | 1792944 A1 | 6/2007 |
| EP | 1958988 B1 | 4/2009 |
| GB | 2384488 A | 7/2003 |
| JP | H103207436 A | 9/1991 |
| JP | H05239167 A | 9/1993 |
| JP | H1014007 A | 1/1998 |
| JP | 2002254427 A | 9/2002 |
| JP | 2009191155 A | 8/2009 |
| JP | 2010100714 A | 5/2010 |
| JP | 2010201287 A | 9/2010 |
| JP | 2016502454 A | 1/2016 |
| KR | 20070090078 A | 9/2007 |
| WO | 0172150 A1 | 10/2001 |
| WO | 0172151 A1 | 10/2001 |
| WO | 01072150 A1 | 10/2001 |
| WO | 2021021817 A1 | 2/2021 |

OTHER PUBLICATIONS

Machine assisted English translation of JP2010100714A obtained from https://patents.google.com/patent on Mar. 10, 2023, 9 pages.
Machine assisted English translation of JPH05239167A obtained from https://patents.google.com/patent on Mar. 10, 2023, 6 pages.
Machine assisted English translation of CN210336692U obtained from https://patents.google.com/patent on Mar. 10, 2023, 12 pages.
International Search Report for PCT/CN2018/000279 dated Sep. 27, 2018, 5 pages.

* cited by examiner

PROCESS AND APPARATUS TO MAKE LIQUID SILICONE RUBBER COMPOSITIONS

CROSS-REFERENCE TO RELATED APPLICATIONS

This application is the National Stage of International Appl. No. PCT/CN2018/000279 filed on 31 Jul. 2018, which claims priority to International Application No. PCT/CN2017/095152 filed on 31 Jul. 2017.

FIELD OF THE INVENTION

The present invention relates to a process and apparatus for the continuous preparation of addition-crosslinking liquid silicone rubber compositions and to elastomeric silicone rubber materials made therefrom. Also disclosed are articles made of the produced liquid silicone rubber compositions.

BACKGROUND OF THE INVENTION

Liquid silicone rubber ("LSR") compositions which cure by addition (sometimes referred to as hydrosilylation) cross-linking are known in the field of silicone rubber. To prevent premature curing before use they are usually prepared in two parts which are mixed together immediately before end use. Manufacturers are continually seeking improved processes to increase process efficiency, minimise waste of time and materials, and to allow for greater flexibility in the type and amounts of ingredients and additives in the liquid silicone rubber compositions.

It is usual to provide liquid silicone rubber compositions in batches, where each batch is adapted to contain different selected additives as required for the intended final use of the composition. In some instances, continuous processes produce too large amounts of liquid silicone rubbers, therefore, batch processes are preferred to provide for smaller batch quantities.

GB2384488 discloses a method for producing a liquid silicone rubber base using two twin-screw continuous kneader/extruder units. This method meets high productivity and other requirements, but suffers from quality consistency because of problems in metering, and feeding. When the system is required to accommodate compositions of different type, problems arise because cleaning and switching are difficult, the overall process becomes complex, and more accessories must be attached to increase the initial investment. There is a desire to have a method for preparing liquid silicone rubber compositions at a high productivity while obviating previous drawbacks.

Assemblies currently used rely on metering pumps (piston or gear) with known pumping volumes to determine master flow. One problem with such assemblies is the variability of the density of the material passing through the assemblies, because of e.g. temperature which can vary over quite a large range e.g. between 20° C. and 130° C., and potentially also because of the presence of air bubbles of various sizes, up to larger air voids. Therefore, a problem remains to accurately ensure that mass flow into and through an extruder is consistent with expectations in order to ensure that materials introduced into an extruder through multiple introduction ports are added in the correct relative proportions. The pressure in current assemblies typically ranges of from 3 bar (300 kPa) to 200 bar (20,000 kPa).

BRIEF SUMMARY OF THE INVENTION

The present invention provides a liquid silicone rubber composition manufacturing assembly sequentially comprising
(i) a preconditioning assembly for the preparation of an silicone rubber base material;
(ii) a primary mass flow meter;
(iii) an extruder device, having a first introduction port adapted for the introduction of silicone rubber base material generated in the preconditioning assembly, at least one additional introduction port and an outlet;
(iv) a packaging assembly; and additionally comprising
(v) a control means adapted to receive mass flow information on silicone rubber base material passing through said primary mass flow meter (ii) from said preconditioning assembly (i), to detect any variation from a predetermined mass flow range of values and to compute and control a compensating rate of introduction of said silicone rubber base material into the extruder device (iii) and/or compensating rate(s) of introduction of additional components through said at least one additional introduction port downstream of the first introduction port in the extruder device.

The present invention also provides a process for the production of addition-crosslinking liquid silicone rubber compositions utilising the above assembly. The process may be continuous or semi-continuous. The process may comprise the steps of
a) Making a silicone rubber base composition in a preconditioning assembly (i);
b) Transferring said silicone rubber base composition from said preconditioning assembly (i) through a primary mass flow meter (ii) and into an extruder device (iii), having a first introduction port adapted for the introduction of the silicone rubber base material, at least one additional introduction port and an outlet, wherein additives may be introduced into the silicone rubber base material whilst being transported through said extruder device by way of the at least one additional introduction port(s);
c) Controlling the mass flow of the silicone rubber base material and additives in the extruder device by way of a control means adapted to detect any variation from a predetermined mass flow range of said silicone rubber base material when passing through said primary mass flow meter and when required, computing and controlling a compensating rate of introduction of said silicone rubber base material into the extruder device via the first introduction port and/or the introduction rate(s) of additional components from said at least one additional introduction port(s) in the extruder device;
d) Mixing the silicone rubber base material and additives in the extruder to make a final composition and
e) conveying the final composition from the outlet of the extruder to a packaging assembly.

The present invention further relates to liquid silicone rubber compositions obtained from said continuous process and articles made therefrom.

Finally disclosed is the use of a primary mass flow meter in liquid silicone rubber composition manufacturing assembly.

The present process allows direct manufacturing of liquid silicone rubber compositions as part of a continuous process flow, which allows addition of ingredients outside the main mixing equipment to prevent extensive cleanouts, campaigning or additional mixing steps.

The present process allows for a continuous process where silicone rubber base material which may be in the form of a masterbatch composition may be run continuously through the assembly, and in which selected ingredients and/or additives may be added via e.g. the additional introduction port(s) in the extruder before the packaging step, so that only a section of the production line requires cleaning when compositions being made on the assembly are changed. The present process may also be adapted to a continuous or semi-continuous process.

DETAILED DESCRIPTION OF THE INVENTION

Figure 1:
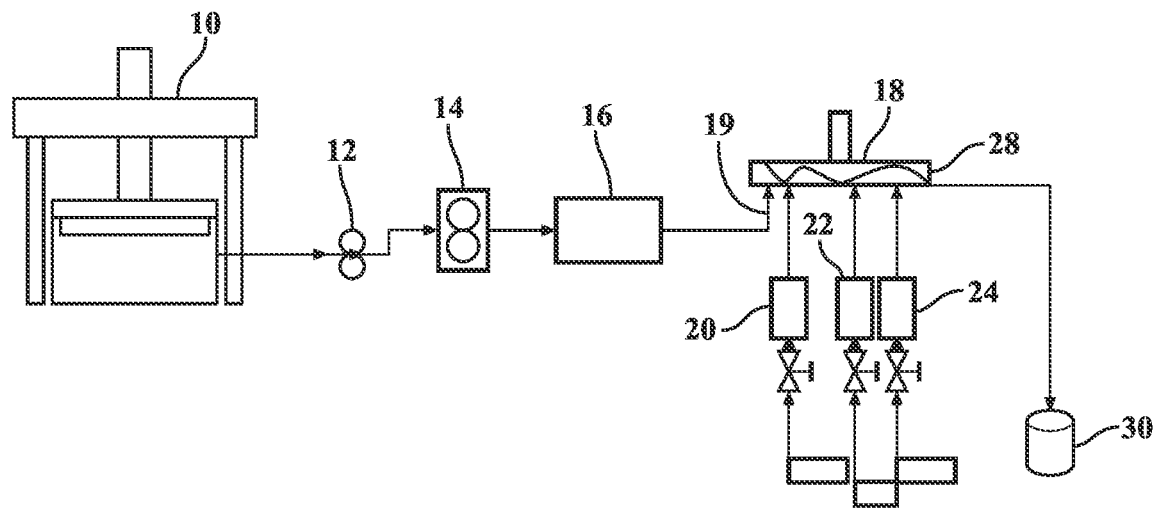
FIG. 1 is a schematic view of an extruder assembly as described herein.

The preconditioning assembly (i) is used for preparing silicone rubber base material and may comprise any suitable compounding unit for mixing/kneading the ingredients thereof. The compounding unit may comprise, for example, a batch kneader or equipment for a continuous assembly suitable for preparing silicone rubber base material.

The preconditioning assembly (i) is utilised to mix the ingredients of a silicone rubber base material. These are typically, liquid alkenyl-containing polydiorganosiloxane polymer(s) and reinforcing filler(s), e.g. silica. The reinforcing filler(s), e.g. silica may have been pre-treated to render it hydrophobic or may be rendered hydrophobic in situ with the inclusion of a filler treating agent as discussed below. The silicone rubber base material may be prepared in the form of a masterbatch, i.e. in a concentrated form which can be diluted by e.g. the addition of further polymer(s) at a later stage in the process. When a part B (crosslinker) composition is being prepared in the assembly, the silicone rubber base material made in the preconditioning assembly may also include organohydrogenpolysiloxane cross-linker but mostly the cross-linker will be introduced into the composition through an additional introduction port in the extruder. When a part A composition is being prepared in the preconditioning assembly, a suitable catalyst, e.g. a platinum catalyst may be introduced into the silicone rubber base material in the preconditioning assembly in which case the extruder is used to introduce additives via the additional introduction ports. For the avoidance of doubt with respect to part A compositions, the silicone rubber base material may be understood to optionally include catalyst e.g. a platinum catalyst. The temperature of the silicone rubber base material upon leaving the preconditioning assembly (i) may range of from 20 to 190° C., alternatively of from 60 to 130° C., alternatively of from 80 to 110° C. dependent on the mixing regime utilised.

The silicone rubber base material produced in the preconditioning assembly (i) is transported from the preconditioning assembly (i) through primary mass flow meter (ii) and into extruder device (iii) by way of the first introduction port. Depending on the mixer type and the batch/continuous nature of the preconditioning assembly, a screen changer and/or a gear pump may be utilised as an "intermediate section" between the preconditioning assembly (i) and the primary mass flow meter (ii). When present, the screen changer is utilised to filter the silicone rubber base material leaving the preconditioning assembly. Said gear pump, when present, is designed to transfer silicone rubber base material through the primary mass flow meter and when in use may impose a pressure of flow of maximum 130 bar (13,000 kPa) upstream of the screen changer, alternatively a maximum of 100 bar (10,000 kPa), prior to passage through the mass flow meter (ii). In some instances, the screen changer and gear pump may be made mandatory. When both a screen changer and a gear pump are present between the preconditioning assembly (i) and the primary mass flow meter (ii) the screen changer may be positioned in line either before or after the gear pump. Alternatively, the screen changer may, when present, be positioned between the outlet of the extruder and the packaging unit.

The primary mass flow meter (ii) of the present assembly is typically based on a Coriolis principle, which may take density variability into account when providing information to the control unit. The control unit may comprise the primary mass flow meter (ii). The primary mass flow meter (ii) may also be referred to as "inertial flow meter". The primary mass flow meter (ii) is used to determine mass flow of silicone rubber base material entering into the extruder and to send signals to the control unit to enable the control unit to control introduction rates of the materials being introduced into the extruder from the multiple additional introduction ports thereof as well as through the first introduction port. It may be able to accommodate variations in temperatures of the silicone rubber base materials entering the extruder device via the first introduction port. These variations may be quite significant as discussed elsewhere herein. In some instances, the control means may be utilised to compute compensating variations in mass flow of additives being introduced into the extruder through the multiple introduction ports of the extruder to compensate for drifts and sudden changes in density of the silicone rubber base material, typically associated with presence of air bubbles or larger voids and which are identified by signals received from the primary mass flow meter. The control unit may determine density adjustments upon flow of the material. The configuration of the primary mass flow meter may be of a curved tube flow meter or straight tube flow meter. The mass flow is therefore controlled up to an accuracy of >99.5% at a minimum flow rate. A pressure drop of 15 bar (1500 kPa) may be considered due to the primary mass flow meter. The operating pressure of the primary mass flow meter is typically <40 bar (4000 kPa).

Each additional introduction port comprises a means of varying the rate of introduction of its respective ingredient and/or additive into the extruder device and is able to provide and receive information from the aforementioned control unit. Typically each additional introduction port may comprise a mass flow meter. Each mass flow meter provided in an additional introduction port is adapted to provide mass flow information of material being introduced into the extruder device through the associated introduction port.

Hence, the control unit is adapted to maintain the level of introduction of each ingredient and/or additive into the extruder device through the one or more additional introduction ports whilst the mass flow values from the primary mass flow meter measuring the mass flow of silicone rubber base material into the extruder device via the first introduction port are maintained with a predetermined range.

As soon as the mass flow measurements from the primary mass flow meter stray above or below the permitted range, the control unit calculates a compensating mass flow for the additional ingredients being introduced into the extruder via the additional introduction port(s) and provides a signal to one or more of the additional introduction ports to vary the mass flow rate of the additives entering the extruder via said additional introduction ports to compensate accordingly.

The control unit may additionally or alternatively be adapted to monitor and identify deviations outside predefined tolerances in relative quantities of ingredients and/or time periods when the composition exiting the extruder does not meet a targeted product composition. The control unit is designed to trigger an alarm/signal in response to the detection of such deviations to warn an operator of potential quality control issues. Alternatively or additionally recognition that such deviations are taking place may be used by the control unit to trigger predefined corrective actions, such as prevention of composition not meeting a targeted product composition being supplied to the packaging unit. This may be done by e.g. diverting non-conforming product by way of one or more valves positioned at the outlet of the extruder to waste and/or in extreme circumstances shutting down the process.

The control unit may also monitor flow rate of the silicone rubber base materials being transported through primary mass flow meter from the preconditioning assembly to maintain a pre-determined minimum flow, to ensure optimum operational accuracy of the primary mass flow meter.

The extruder may typically be selected from intermeshing twin screw extruders, which may be co-rotating or counter rotating. Typically, the extruder is an intermeshing co-rotating twin screw extruder. The twin screw extruder is used for mixing and introducing ingredients via introduction ports to make the final composition but may also be used to deaerate material passing therethrough to remove the aforementioned air bubbles and larger voids. A further advantage of using a co-rotating twin screw extruder is that the twin screws are designed to effectively be self-cleaning.

Dimensions of the moving mixing elements will be selected to provide sufficient shear in proportion to the mass flow having to be processed. The diameter of the moving elements may range of from 25 to 100 mm, alternatively 30 to 75 mm, alternatively 45 to 65 mm. The L/D ratio may range of from 12 to 30, alternatively from 12 to 24, alternatively from 16 to 20.

The twin screw extruder barrel preferably contains three sections along the length of the extruder between the first introduction port and the outlet, connected end-to-end. The first section being an initial feed section for the introduction of silicone rubber base material through the first introduction port. Given the silicone rubber base material may be in the form of a masterbatch or concentrate, the first section may also contain additional introduction ports, for the introduction of additional amounts of the ingredients forming the silicone rubber base material, sometimes referred to as "non-differentiating" materials with the intention of introducing the correct proportions thereof for the final composition.

The second section in the extruder is preferably a vacuum section which is utilised to first deaerate the silicone rubber base material and to subsequently introduce additional ingredients and/or optional additives into the silicone rubber base material or mixture of silicone rubber base and non-differentiating materials introduced into the extruder in the first section. The additional ingredients and optional additives are considered to be "differentiating" materials in that they are ingredients/additives not contained in the liquid silicone rubber base material. Depending on the composition being generated during the process such ingredients tend to be, for example catalyst when part A compositions are being prepared or alternatively cross-linker and if required inhibitor when part B compositions are being prepared as well as required additives depending on the end use. As previously indicated the final mixed silicone rubber compositions herein are typically "part A" compositions comprising silicone rubber base material and catalyst or "part B" compositions comprising silicone rubber base materials and cross-linker and inhibitor. Either part A or part B may contain suitable additives, providing they do not negatively interact with the other ingredients in that part. One advantage of the present invention is that the assembly is easy to clean, not least in the case of the extruder, given the self-cleaning nature of the co-rotating screws and the ability to exchange or vary the additional introductions ports used dependent on the composition being prepared on the assembly.

The third section is effectively a pressure building section which also functions as a mixing zone to ensure good mixing of the ingredients and additives introduced into the composition. The three sections may be divided amongst 3 or more extruder barrels, typically 3, 4 or 5. When the extruder consists of 3 barrels there is effectively one per section. In the case of a four barrel extruder the first barrel is effectively equivalent to the first section, barrels 2 and 3 function as the second section, with a deaeration port typically located before introduction of additional ingredients and optional additives via additional introduction ports and finally the fourth barrel being equivalent to the third section.

In the case of a five barrel system any of the sections may contain the additional barrel, depending on requirements, for example the second section utilises two barrels and either the first or third section incorporates a fifth barrel, typically an additional part of the third section thereby providing an elongate mixing section.

The first section of the extruder may be provided with the first introduction port for introduction of the silicone rubber base material and/or one or more additional introduction ports. Each additional introduction port may contain a mass flow meter adapted to provide mass flow details to the control means as well as a controllable pump or the like adapted to vary the mass flow of additive being introduced into the extruder dependent on the mass flow of the silicone rubber base material entering the extruder through said first introduction port.

Materials to be added in the first extruder section are typically undifferentiated materials as discussed above, i.e. more of the same polymer(s) as those present in the silicone rubber base material or different polymers selected from the liquid alkenyl-containing polydiorganosiloxane and/or organohydrogenpolysiloxane cross-linker (when present in the base material).

The pressure in the first section of the extruder may range of from −500 mbar (50 kPa) to +1000 mbar (100 kPa). One or more vent openings may also be provided for the removal/release of, for example, trapped air or volatile materials. However, preferably such vent openings and the like are present in the second (vacuum) section.

The second section of the extruder may be provided under vacuum, and may thus comprise one or more vent openings for removal of air and volatiles and at least one, or at least two, introduction port(s) through which ingredients and/or additives may be added or removed. The pressure in the second section (2) may range of from −900 mbar (−90 kPa) to −500 mbar (−50 kPa).

Materials to be removed include at least air, to provide for the appropriate vacuum and potentially further volatile components. Silicone rubber base material may additionally be removed to compensate for ingredients and/or additives introduced through one or more additional introduction ports, thereby preventing the said removed silicone rubber base material from going through the entire process chain only to be discarded. This is because the control unit is able to track the total amount of the ingredients in the extruder device and is able to ensure that the composition leaving the extruder is within the required composition ranges.

Materials to be added may include catalyst if part A is being made or cross-linker and inhibitor if part B is being made. In either case any of the additives may be introduced into part A or part B composition providing they don't interfere with the ingredients present therein. At least 1 and up to 8 different components may be added into the second section of the extruder, alternatively up to 6. Typically, the materials which may be added in the second section of the extruder will be considered "differentiated" materials, that is, ingredients which do not generally enter into the extruder as part of the silicone rubber base material via the first introduction port, that is, ingredients which may be differentiated in terms of reactivity, colour, or end use. Materials to be added include those recycled from upstream or downstream the process.

Materials requiring high dosing accuracy may be added through a pressure hold loop, with a line branching off to the extruder with a flow element and control valve. The introduction port valves may be equipped with closing systems to avoid unintended bleed of additive into the extruder. The feed system may also be equipped with quality checks monitoring the actual flow rate of the materials to be added versus the target flow rate and/or the minimum flow rate.

Materials may be added with a rate of accuracy of >95%, alternatively >99%.

The pressure required for the additive feeds typically ranges of from −900 mbar (−90 kPa) to +500 mbar (+50 kPa) relative to ambient pressure measured at the respective extruder introduction port.

In some instances, the second section of the extruder under vacuum is provided as two separate sub-sections in which a first sub-section is equipped with a vent outlet for air and volatile compounds, while the second sub-section is equipped with at least one introduction port for selected additives. In typical circumstances, at least one and up to 6 introduction ports may be present on the second sub-section, alternatively up to 4.

The third section of the extruder, may be connected at the outlet to a downstream unit or to the packaging unit. The liquid silicone rubber undergoes final mixing in this third section of the extruder. Typically, the pressure in the third section of the extruder ranges of from −500 mbar (−50 kPa) to +12 bar (1200 kPa). The pressure is intended to build force to move the material from the extruder into the outlet hose, driving into the packaging or filling unit. The pressure may thus be adapted to the type of hose and connections used downstream the extruder assembly.

In some instances, the third section of the extruder may also be provided as two separate sub-sections, each set up to allow for pressure equilibration between the second section of the extruder under vacuum and the packaging section at about atmospheric (standard) pressure at the outlet of the extruder. The typical outlet pressure may range of from 5 bar (500 kPa) to 20 bar (2000 kPa), alternatively of from 5 bar (500 kPa) to 10 bar (1000 kPa). Pressures up to 30 bar (3000 kPa) may be possible, but may be less practical in view of the pressure rating of hoses and connectors in the line.

The total volume of the extruder assembly is <3 Litres, typically <2 Litres. It is expected the entire extruder assembly will be filled with the liquid silicone rubber being processed. Typically, the first section of the extruder may be partially filled, up to 90 or 95% volume. The third section of the extruder will be typically filled up to 99% or 100% volume due to pressure imposed to ensure the material flows outside of the extruder and the removal of air and volatiles during passage through the second section of the extruder. The second section of the extruder under vacuum may only be partially filled. The amount of liquid silicone rubber being processed under vacuum may range of from 30 to 70% of the total liquid silicone rubber being processed, alternatively of from 40 to 60%.

The temperature of the material being transported through the extruder device is to a large extent largely dependent on the temperature of the liquid silicone rubber base materials and other ingredients and additives when introduced into the extruder. Hence, the temperature of materials in the extruder etc. may range of from 20 to 250° C., alternatively of from 20 to 130° C., alternatively of from 60 to 130° C. If required the temperatures can be reduced by cooling the extruder as and when required.

Temperature sensors may be present in the main extruder device barrel, in the first introduction port and also in each additional introduction port. When present these are designed to measure and/or control temperature along the extruder in the different head sections. Alternatively they may be adapted to send a signal to the control unit for temperature control. Temperature may be ranging of from 20 to 160° C., alternatively of from 60 to 130° C., alternatively of from 80 to 110° C.

The outlet of the extruder may be connected to switches/valves to direct materials coming out of the extruder to be directed to the appropriate packaging unit. There may be dedicated packaging units for e.g. part A compositions and likewise dedicated packaging units for part B compositions with a view to avoiding cross-contamination. Likewise the control unit may actuate the valves/switches to remove material if it does not meet the required composition specification.

The packaging assembly includes the potential hoses, valves, fixed or removable containers used to dispose of the liquid silicone rubber compositions being processed. Hoses include any type of hoses used in manufacturing of liquid silicone rubbers, of varying length, diameter and compositions. Valves include any of those valves used in manufacturing equipment to direct flow of material towards one direction or alternate directions. Containers include pails, drums, bottles, or any other suitable container for transportation and warehousing.

The temperature of the packaging assembly may range of from 20 to 160° C., alternatively of from 20 to 130° C., alternatively from 20 to 80° C. Typically these temperatures are largely dependent on the temperatures of the materials leaving the extruder.

As previously discussed there is provided herein a continuous process for the production of liquid silicone rubbers using the extruder assembly described above.

Said continuous process may comprise the steps of
a) Making a silicone rubber base composition in a pre-conditioning assembly (i);
b) Transferring said silicone rubber base composition from said preconditioning assembly (i) through a primary mass flow meter (ii) and into an extruder device (iii), having a first introduction port adapted for the introduction of the silicone rubber base material, at least one additional introduction port and an outlet, wherein additives may be introduced into the silicone rubber base material whilst being transported through said extruder device by way of the at least one additional introduction port(s);

c) Controlling the mass flow of the silicone rubber base material and additives in the extruder device by way of a control means adapted to detect any variation from a predetermined mass flow range of said silicone rubber base material when passing through said primary mass flow meter and when required, computing and controlling a compensating rate of introduction of said silicone rubber base material into the extruder device via the first introduction port and/or the introduction rate(s) of additional components from said at least one additional introduction port(s) in the extruder device;

d) Mixing the silicone rubber base material and additives in the extruder to make a final composition and e) conveying the final composition from the outlet of the extruder to a packaging assembly.

As previously mentioned, the control unit may additionally or alternatively be adapted to monitor and identify deviations outside pre-defined tolerances in relative quantities of ingredients and/or time periods when the composition exiting the extruder does not meet a targeted product composition. The control unit is designed to trigger an alarm/signal in response to the detection of such deviations to warn an operator of potential quality control issues. Alternatively or additionally recognition that such deviations are taking place may be used by the control unit to trigger predefined corrective actions, such as prevention of composition not meeting a targeted product composition being supplied to the packaging unit. This may be done by e.g. diverting non-conforming product by way of one or more valves positioned at the outlet of the extruder to waste and/or in extreme circumstances shutting down the process.

The control unit may also monitor flow rate of the silicone rubber base materials being transported through primary mass flow meter from the preconditioning assembly to maintain a pre-determined minimum flow, to ensure optimum operational accuracy of the primary mass flow meter.

The silicone rubber base material which is produced in the preconditioning assembly (i) be in the form of a concentrate/masterbatch which may be referred to herein as an intermediate composition but will usually comprise liquid alkenyl-containing polydiorganosiloxane and reinforcing filler(s), e.g. silica. The silica may have been pre-treated to render it hydrophobic or may be rendered hydrophobic in situ with the inclusion of a filler treating agent as discussed below. The silicone rubber base material may also include organohydrogenpolysiloxane cross-linker.

Said silicone rubber base material may be prepared according to known methods such as kneading, mixing or extruding, in said preconditioning assembly (i) and therefore may contain voids and/or bubbles, depending on the mixing process(es) relied upon in the preconditioning assembly. The temperature of the silicone rubber base material produced will vary dependent on the process conditions.

When the optional screen changer and gear pump are present, the silicone rubber base material is moved from said preconditioning assembly through the screen changer and gear pump in the order they are positioned between the preconditioning assembly and primary mass flow meter prior to passing through the primary mass flow meter before entering the extruder device by way of the first introduction port. Once in the extruder device, the silicone rubber base material is transported down the barrels of the extruder device by means of the co-rotative twin screw type of equipment towards the outlet with additional ingredients and/or additives being added thereto from the additional introduction port(s) as controlled by the control unit hereinbefore described. Once the silicone rubber base has travelled the length of the extruder device and been inter-mixed with the different ingredients and/or additives under the control of the control unit, a thoroughly mixed final liquid silicone rubber composition is achieved. The final composition may then be conveyed into the packaging unit as per the required uses of said liquid silicone rubber compositions or if out of the required specification the control unit may cause it to be removed to waste.

The present process is considered continuous in that a silicone rubber base material is prepared in the preconditioning assembly and indeed when e.g. just additional polymer is introduced into the first head of the extruder there is provided a partial non differentiated polymer composition initially in the extruder device which can then be adapted according to the ingredients and additives introduced through additional introduction ports in the second extruder section under vacuum to provide for a final (differentiated) liquid silicone rubber composition. Typically the final differentiated liquid silicone rubber composition is a part A composition containing catalyst or a part B composition comprising cross-linker and inhibitor.

When a change of material is required, i.e. due to the change in product being manufactured, a certain mass of silicone rubber base material may be passed through the extruder device to serve to clean the extruder device and the control unit may be utilised to prevent introduction of additives during its passage through the extruder device barrel. Optionally, feed hoses used may be disconnectable and the introduction port s used in the extruder may be designed to enable complete removal of wetted parts. In some instances, a clear liquid silicone rubber composition may be made after introduction of a pigment which can result in a pigmented liquid silicone rubber composition as the final product. In other instances, it may be possible to prepare part A and Part B of a liquid silicone rubber composition on the same line. This is particularly the case if each composition made uses a separate hose for transferring final product from the extruder outlet to the packaging unit. The changeover between products with otherwise incompatible additive packages is supported by the self-cleaning nature of the co-rotative twin screw extruder, which is used as a mixing device here.

In some instances, the preconditioning assembly may be directed to more than one extruder assembly, by adapting the number of lines directing outwards of the preconditioning unit. Alternatively, the preconditioning assembly may be directed to more than one gear pump and screen changer. That is, the preconditioning assembly may provide for more than one independent extruder assembly downstream the preconditioning assembly.

The present process may thus be considered as an upgrade of the packaging section of a batch or continuous process, which allows addition of ingredients outside the main mixing equipment (or typical conditioning assembly) to prevent extensive cleanouts, campaigning or additional mixing steps.

The present invention includes liquid silicone rubber compositions provided by the above process.

Any type of liquid silicone rubber composition may be prepared according to the present process, using the present liquid silicone rubber composition manufacturing assembly. The standard ingredients which may enter in the composition of a liquid silicone rubber composition prepared according to the present process may be as follows:

(A') Liquid alkenyl-containing polydiorganosiloxane generally having at least two alkenyl groups per molecule;

(B') Organohydrogenpolysiloxane, typically having at least two, alternatively at least three Si—H groups per molecule;
(C) Reinforcing filler;
(D) Hydrosilylation (addition cure) catalyst and; if required
(E) Inhibitor.

A variety of other additives may be used depending on the end use/application of the composition.

Generally components (A') and (C) will always be introduced into the extruder as a mixture of silicone rubber base material, previously prepared in the preconditioning assembly as described above. Additional polymer(s) may be introduced using additional introduction ports as non-differentiated additives in the first section of the extruder as and when required, not least when the silicone rubber base material has been prepared in the form of a concentrate or masterbatch. As previously indicated the other ingredients are introduced dependent on whether a part A composition or part B composition is being made through additional introduction ports in the second section of the extruder. If preparing part A compositions, catalyst (D) is introduced into the silicone rubber base material. If preparing a part B composition, cross-linker (B') and inhibitor (E) (when present) are introduced into the liquid silicone rubber base material through additional introduction ports in section two of the extruder.

It is because mixtures of the aforementioned ingredients (A'), (B'), and (D) may begin to cure at ambient temperature that addition cured silicone rubbers are stored prior to use in two part form, i.e. part A (ingredients (A'), (C) and (D) and part B components (A'), (B'), (C) and (E).

The rate of introduction of additives through the additional introduction ports is controlled by the control unit and adjusted dependent on the mass flow measurements received from the primary mass flow meter in regards to the silicone rubber base material.

A') Liquid Alkenyl-Containing Polydiorganosiloxane

Ingredient (A') is a liquid polydiorganosiloxane containing at least two silicon-bonded alkenyl groups in each molecule. Suitable alkenyl groups in ingredient (A') typically contain from 2 to 10 carbon atoms, preferred example, vinyl, isopropenyl, allyl, and 5-hexenyl. Ingredient (A') typically additionally comprises silicon-bonded organic groups other than alkenyl groups. Such silicon-bonded organic groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with the groups that do not interfere with curing of this inventive composition, such as halogen atoms. Preferred species of the silicon-bonded organic groups are, for example, alkyl groups such as methyl, ethyl, and propyl; halogenated alkyl groups such as 3,3,3-trifluoropropyl; and aryl groups such as phenyl.

The molecular structure of ingredient (A') is typically linear, however, there can be some branching due to the presence of trivalent siloxane units within the molecule. To achieve a useful level of physical properties in the elastomer prepared by curing the LSR composition of the present invention, the molecular weight of ingredient (A') should be sufficient so that it achieves a viscosity of at least 0.1 Pa·s at 25° C. Unless otherwise indicated all viscosity measurements were taken at 25° C. using a plate/plate rheometer. The upper limit for the molecular weight of ingredient (A') is not specifically restricted and is typically limited only by the processability of the LSR composition of the present invention.

Examples of ingredient (A') are polydiorganosiloxanes containing alkenyl groups at the two terminals and are represented by the general formula (I):

R'R"R'''SiO—(R"R'''SiO)$_m$—SiOR"'R"R' (I)

In formula (I), each R' is an alkenyl group, which typically contains from 2 to 10 carbon atoms, such as vinyl, allyl, and 5-hexenyl.

R" does not contain ethylenic unsaturation, Each R" may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R" may be unsubstituted or substituted with one or more groups that do not interfere with curing of this inventive composition, such as halogen atoms. R'" is R' or R". m represents a degree of polymerization suitable for ingredient (A') to have a viscosity of at least 0.1 Pa·s at 25° C., typically from 0.1 to 300 Pa·s 25° C. using a plate/plate rheometer.

Typically, all R" and R'" groups contained in a compound in accordance with formula (I) are methyl groups. Alternatively at least one R" and/or R'" group in a compound in accordance with formula (I) is methyl and the others are phenyl or 3,3,3-trifluoropropyl. This preference is based on the availability of the reactants typically used to prepare the polydiorganosiloxanes (ingredient (A')) and the desired properties for the cured elastomer prepared from compositions comprising such polydiorganosiloxanes.

Typical examples of ingredient (A') containing ethylenically unsaturated hydrocarbon groups only in terminal groups include, but are not limited to, dimethylvinylsiloxy-terminated polydimethylsiloxane, dimethylvinylsiloxy-terminated polymethyl-3,3,3-trifluoropropylslioxane, dimethylvinylsiloxy-terminated dimethylsiloxane-3,3,3-trifluoropropylmethylsiloxne copolymer, and dimethylvinylsiloxy-terminated dimethylsiloxane/methylphenylsiloxane copolymer.

Generally, ingredient (A') has a viscosity of at least 0.1 Pa·s at 25° C., typically from 0.1 to 300 Pa·s, more typically 0.1 to 100 Pa·s at 25° C. using a plate/plate rheometer.

(B') Organohydrogenpolysiloxane

Ingredient (B') is an organohydrogenpolysiloxane, which operates as a cross-linker for polymer (A'), by the addition reaction of the silicon-bonded hydrogen atoms in ingredient (B') with the alkenyl groups in ingredient (A') under the catalytic activity of ingredient (D) to be mentioned below. Ingredient (B') normally contains 3 or more silicon-bonded hydrogen atoms so that the hydrogen atoms of this ingredient can sufficiently react with the alkenyl groups of ingredient (A') to form a network structure therewith and thereby cure the composition. Typically the cross-linker is stored in a part B composition avoiding contact with the catalyst.

The molecular configuration of ingredient (B') is not specifically restricted, and it can be straight chain, branch-containing straight chain, or cyclic. While the molecular weight of this ingredient is not specifically restricted, the viscosity is typically from 0.001 to 50 Pa·s at 25° C. using a plate/plate rheometer in order to obtain a good miscibility with ingredient (A').

Ingredient (B') is typically added in an amount such that when part A and part B of a formulation are mixed together, the molar ratio of the total number of the silicon-bonded hydrogen atoms in ingredient (B') to the total number of all alkenyl groups in ingredient (A') is from 0.5:1 to 20:1. When this ratio is less than 0.5:1, a well-cured composition will not be obtained. When the ratio exceeds 20:1, there is a tendency for the hardness of the cured composition to increase when heated.

Examples of ingredient (B') include but are not limited to:
  (i) trimethylsiloxy-terminated methylhydrogenpolysiloxane,
  (ii) trimethylsiloxy-terminated polydimethylsiloxane-methylhydrogensiloxane,
  (iii) dimethylhydrogensiloxy-terminated dimethylsiloxane-methylhydrogensiloxane copolymers,
  (iv) dimethylsiloxane-methylhydrogensiloxane cyclic copolymers,
  (v) copolymers composed of $(CH_3)_2HSiO_{1/2}$ units and $SiO_{4/2}$ units, and
  (vi) copolymers composed of $(CH_3)_3SiO_{1/2}$ units, $(CH_3)_2HSiO_{1/2}$ units, and $SiO_{4/2}$ units.

(C) Reinforcing Filler

To achieve high level of physical properties that characterize some types of cured elastomer that can be prepared using the LSR composition of the present invention, it is desirable to include a reinforcing filler such as finely divided silica. Silica and other reinforcing fillers are often treated with one or more known filler treating agents to prevent a phenomenon referred to as "creping" or "crepe hardening" during processing of the curable composition.

Finely divided forms of silica are preferred reinforcing fillers. Colloidal silicas are particularly preferred because of their relatively high surface area, which is typically at least 50 $m^2/g$ (BET method). Fillers having surface areas of from 100 to 400 $m^2/g$ (BET method), alternatively of from 100 to 300 $m^2/g$ (BET method), are typically used. Colloidal silicas can be provided in the form of precipitated or fumed silica. Both types of silica are commercially available.

The amount of finely divided silica or other reinforcing filler used in the LSR composition of the present invention is at least in part determined by the physical properties desired in the cured elastomer. The present process allows for an amount of reinforcing filler in the liquid silicone rubber composition of from 1 to 40% wt, alternatively of from 1 to 30% wt. In some instances, the amount of reinforcing filler may be of from 1 to 10% wt. and as previously indicated it will largely, but not necessarily exclusively, be introduced into the extruder as part of the silicone rubber base material.

When the filler is naturally hydrophilic (e.g. untreated silica fillers), it is typically treated with a treating agent. This may be prior to introduction in the composition or in situ (i.e. in the presence of at least a portion of the other ingredients of the LSR composition of the present invention by blending these ingredients together until the filler is completely treated and uniformly dispersed to for a homogeneous material). Typically, untreated filler is treated in situ with a treating agent in the presence of ingredient (A').

Typically the filler is surface treated using for example with a fatty acid or a fatty acid ester such as a stearate, or with organosilanes, polydiorganosiloxanes, or organosilazanes hexaalkyl disilazane or short chain siloxane diols to render the filler(s) hydrophobic and therefore easier to handle and obtain a homogeneous mixture with the other ingredients. The surface treatment of the fillers makes the fillers easily wetted by the silicone polymer. These surface modified fillers do not clump, and can be homogeneously incorporated into the silicone polymer. This results in improved room temperature mechanical properties of the uncured compositions.

Typically the filler treating agent can be any low molecular weight organosilicon compounds disclosed in the art applicable to prevent creping of organosiloxane compositions during processing.

The treating agents are exemplified but not limited to liquid hydroxyl-terminated polydiorganosiloxane containing an average from 2 to 20 repeating units of diorganosiloxane in each molecule, hexaorganodisiloxane, hexaorganodisilazane, and the like. The hexaorganodisilazane intends to hydrolyze under conditions used to treat the filler to form the organosilicon compounds with hydroxyl groups. Typically, at least a portion of the silicon-bonded hydrocarbon groups present in the treating agent are identical to a majority of the hydrocarbon groups present in ingredients (A') and (B'). A small amount of water can be added together with the silica treating agent(s) as processing aid.

It is believed that the treating agents function by reacting with silicon-bonded hydroxyl groups present on the surface of the silica or other filler particles to reduce interaction between these particles.

The filler may be treated with the treating agent prior to formulating, and treated filler is commercially available. The filler is generally present in the silicone rubber base material in combination with polymer (A') and consequently forms part of the part A compositions with polymer (A') and catalyst (D) and forms part of the (B') part B compositions with cross-linker (B') and inhibitor (E) when present.

(D) Hydrosilylation Catalyst

Curing of the LSR composition of the present invention is catalysed by ingredient (D), which is a hydrosilylation (addition cure) catalyst that is a metal selected from the platinum metals, i.e. platinum, ruthenium, osmium, rhodium, iridium and palladium, or a compound of such metals. The metals include platinum, palladium, and rhodium but platinum and platinum compounds are preferred due to the high activity level of these catalysts for hydrosilylation reactions.

Example of preferred curing catalysts include but are not limited to platinum black, platinum on various solid supports, chloroplatinic acids, alcohol solutions of chloroplatinic acid, and complexes of chloroplatinic acid with liquid ethylenically unsaturated compounds such as olefins and organosiloxanes containing ethylenically unsaturated silicon-bonded hydrocarbon groups. Complexes of chloroplatinic acid with organosiloxanes containing ethylenically unsaturated hydrocarbon groups are described in U.S. Pat. No. 3,419,593.

The concentration of ingredient (D) in the LSR composition of the present invention is equivalent to a metal concentration of the selected platinum metal based catalyst of from 0.1 to 500 parts by weight of platinum-group metal, per million parts (ppm), based on the combined weight of ingredients of (A') part A composition and the ingredients of (B') part B composition.

(E) Inhibitor

To obtain a longer working time or pot life of the LSR composition of the present invention, a suitable inhibitor may be incorporated in (B') part B compositions used in order to retard or suppress the activity of the catalyst. For example, the alkenyl-substituted siloxanes as described in U.S. Pat. No. 3,989,887 may be used. Cyclic methylvinylsiloxanes are preferred.

Inhibitors of platinum based catalyst are well known in the art. Hydrosilylation or Addition-reaction inhibitors include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines.

Another class of known inhibitors of platinum catalysts includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

Inhibitor concentrations as low as 1 mole of inhibitor per mole of the metal will in some instances impart satisfactory storage stability and cure rate. In other instances inhibitor concentrations of up to 500 moles of inhibitor per mole of the metal are required. The optimum concentration for a given inhibitor in a given composition is readily determined by routine experimentation.

Additives

Additives may be present in the composition depending on the intended use of the curable silicone elastomer composition. They may be stored in either part A of the composition or part B of the composition as preferred providing they do not negatively affect the cure process in any way. Examples of additives include electrical conductive fillers, thermally conductive fillers, non-conductive filler, pot life extenders, flame retardants, lubricants, pigments, colouring agents, adhesion promoters, chain extenders, silicone polyethers, and mixtures thereof. Further examples of additives include mold release agents, diluents, solvents, UV light stabilizers, bactericides, wetting agent, heat stabilizer, compression set additive, plasticizer, and mixtures thereof. The additives may be added in the form of powders and in the form of liquids. When in liquid form, the additives may have a viscosity ranging of from 0.01 to 100 Pa·s at 25° C., alternatively of from 0.05 to 50 Pa·s at 25° C.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide, aluminium oxide), graphite, diamond, and mixtures or derivatives thereof.

Examples of non-conductive fillers include quartz powder, diatomaceous earth, talc, clay, alumina, mica, calcium carbonate, magnesium carbonate, hollow glass, glass fibre, hollow resin and plated powder, and mixtures or derivatives thereof.

Pot life extenders, such as triazole, may be used, but are not considered necessary in the scope of the present invention. The liquid curable silicone elastomer composition may thus be free of pot life extender.

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of lubricants include tetrafluoroethylene, resin powder, graphite, fluorinated graphite, talc, boron nitride, fluorine oil, silicone oil, phenyl functional silicone oil, molybdenum disulfide, and mixtures or derivatives thereof.

Further additives include silicone fluids, such as trimethylsilyl or OH terminated siloxanes. Such trimethylsiloxy or OH terminated polydimethylsiloxanes typically have a viscosity <150 mPa·s. When present such silicone fluid may be present in the liquid curable silicone elastomer composition in an amount ranging of from 0.1 to 5% weight, based on the total weight of the composition. Other additives include silicone resin materials, which may or may not contain alkenyl or hydroxyl functional groups.

Examples of pigments include carbon black, iron oxides, titanium dioxide, chromium oxide, bismuth vanadium oxide and mixtures or derivatives thereof.

Examples of colouring agents include vat dyes, reactive dyes, acid dyes, chrome dyes, disperse dyes, cationic dyes and mixtures thereof.

Examples of adhesion promoters include silane coupling agents, alkoxysilane containing methacrylic groups or acrylic groups such as methacryloxymethyl-trimethoxysilane, 3-methacryloxypropyl-tirmethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane; zirconium chelate compound such as zirconium (IV) tetraacetyl acetonate, zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), diisopropoxy bis (2,2,6,6-tetramethyl-heptanethionate) zirconium, or similar zirconium complexes having f3-diketones (including alkyl-substituted and fluoro-substituted forms thereof); epoxy-containing alkoxysilanes such as 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Examples of chain extenders include disiloxane or a low molecular weight polyorganosiloxane containing two silicon-bonded hydrogen atoms at the terminal positions. The chain extender typically reacts with the alkenyl groups of ingredient (A'), thereby linking two or more molecules of ingredient (A') together and increasing its effective molecular weight and the distance between potential cross-linking sites.

A disiloxane is typically represented by the general formula $(HR^a_2Si)_2O$. When the chain extender is a polyorganosiloxane, it has terminal units of the general formula $HR^a_2SiO_{1/2}$ and non-terminal units of the formula $R^b_2SiO$. In these formulae, Ra and R b individually represent unsubstituted or substituted monovalent hydrocarbon groups that are free of ethylenic unsaturation, which include, but are not limited to alkyl groups containing from 1 to 10 carbon atoms, substituted alkyl groups containing from 1 to 10 carbon atoms such as chloromethyl and 3,3,3-trifluoropropyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

Examples of silicone polyether include polydiorganosiloxane-polyether copolymer, which is represented by the general formula (II):

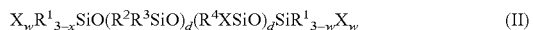

(where X is —$R^5$—$(OC_2H_4)_y(OA)_z$E)

wherein $R^1$, $R^2$, $R^3$, and $R^4$ are independently selected from monovalent saturated hydrocarbon groups, which typically contain from 1 to 10 carbon atoms, and monovalent aromatic hydrocarbon groups, which typically contain from 6 to 12 carbon atoms; E is identical or different and selected from hydroxy, alkoxy typically containing from 1 to 6 carbon atoms, and carboxyl; A is an alkylene typically containing from 1 to 6 carbon atoms; $R^5$ denotes an alkylene radical typically containing 2 to 6 carbon atoms; w is an integer of 0, 1, or 2, and must be 1 or 2 when d' is zero; d is an integer of 0 to 200, and d' is an integer of 0 to 15, where d and d' are present in amounts relative to each other such that ingredient (D) contains from 5 to 50 percent by mole of polyether per molecule; y and z are independently integer of 0 to 30, the sum of y and z being in the range from 2 to 50.

$R^1$, $R^2$, $R^3$, and $R^4$ are typically methyl. $R^5$ is typically propylene or iso-butylene. E is typically hydroxyl, methoxy, or acetoxy. A is typically propylene, iso-propylene, or butylene.

When or if present, of the sum of the total weight % of the aforementioned additional ingredients based on the total weight % of part A+part B is from 1 to 30% wt, alternatively of from 1 to 20% wt.

Hence, the assembly as described herein and the process using the assembly are designed to make either part A and/or part B compositions at any one time. The part A and part B of a liquid silicone rubber are mixed together shortly prior to use to initiate cure of the full composition into a silicone elastomeric material. The compositions can be designed to be mixed in any suitable ratio e.g. part A: part B may be mixed together in ratios of from 10:1 to 1:10, alternatively from 5:1 to 1:5, alternatively from 2:1 to 1:2, but most preferred is a ratio of 1:1.

When a typical part A composition and a typical part B composition are mixed together the total composition will comprise
(A) Liquid alkenyl-containing polydiorganosiloxane generally having at least two alkenyl groups per molecule;
(B) Organohydrogenpolysiloxane, typically having at least two, alternatively at least three Si—H groups per molecule; in an amount such that when part A and part B of a formulation are mixed together, the molar ratio of the total number of the silicon-bonded hydrogen atoms in ingredient (B') to the total number of all alkenyl groups in ingredient (A') is from 0.5:1 to 20:1.
(C) Reinforcing filler in an amount of from 1 to 40% wt, alternatively of from 1 to 30% wt, alternatively from 1 to 10% wt.
(D) Hydrosilylation (addition cure) catalyst is equivalent to a concentration from 0.1 to 500 parts by weight of the selected platinum metal based catalyst per million parts (ppm), platinum-group metal, per million parts (ppm), based on the combined weight of (A') part A and (B') part B. and; if required
(E) Inhibitor. In an amount of from 1 mole of inhibitor per mole of the metal 500 moles of inhibitor per mole of the metal;

The additives as hereinbefore described may be present in the composition within a cumulative total of from 0 to 30% wt, alternatively of from 0 to 20% wt.

The viscosity of the liquid silicone rubber composition ranges of from 10 to 1000 Pa·s, alternatively of from 10 to 5.00 Pa·s. Unless otherwise indicated all viscosity measurements were taken at 25° C. using a plate plate rheometer.

The liquid silicone rubber composition obtained by the present process may be further used by mixing a part A composition with a part B composition to make a final curable composition and curing/molding etc. via any suitable means for example, injection moulding, press moulding, dispenser moulding, casting, calendering, coating, printing bead application.

Curing of the liquid curable silicone elastomer composition may be carried out as required by the type of liquid silicone rubber utilized. Typical curing temperatures may range of from 120 to 200° C., alternatively from 80 to 120° C., alternatively from 50 to 80° C.

Curing can for example take place in a mold to form a moulded silicone article. The composition may for example be injection moulded to form an article, or the composition can be overmoulded by injection moulding around an article or over a substrate.

In one embodiment, the present invention relates to an article cured from the liquid silicone rubber composition made by the process as hereinbefore described using the assembly as hereinbefore described. Such articles include those that may be used in producing sports products, diving masks, ventilator bellows, balloon catheters, rubber teats, pacifiers, thin-walled membranes, switch covers, spark-plug connectors, medical products and devices, electrical insulators, single-wire seals, plug connector seals, tubing and valves, automobile components such as connector seal and spark plug boots, electric and electronic parts such as rolls in a copying machine and packing in a microwave oven; as well as other products such as feeding bottle nipple and diving gears, in view of the high heat resistance, cold resistance, safety, electric insulation, weatherability, and the like.

The curable liquid silicone rubber composition resulting from mixing a part A composition and a part B composition may be cured into silicone elastomer articles, such as tubes, strips, solid cord or custom profiles according to the size specifications of the manufacturer.

The cured silicone rubber obtained from curing the liquid silicone rubber composition of the present invention may provide for composite parts where mechanical or chemical bonding to a substrate occurs.

In one embodiment, the present invention relates to a composite part comprising a silicone elastomer cured from the liquid silicone rubber composition on a substrate with either or both of parts A and B being made on the assembly described herein using the process as described herein.

The substrate may be rigid or flexible. Examples of substrates include plastic substrates, thermoplastic substrates, metal substrates, cellulose substrates and textile substrates.

Examples of plastic substrates and thermoplastic substrates (also organic resins) include acrylonitrile-butadiene-styrene, polyphenylene/styrene blends, polystyrenes, polycarbonate, polyurethane, styrene resin, polyethylene, polypropylene, acrylic, polyacrylamides, polyesters, polyethylene terephthalate, polybutylene terephthalate, polyphenylene oxide, polyphenylene sulfide, polysulfone, nylon, polyamide, polyimide, fluoropolymers, and liquid crystal resin, non-resin containing polyetherimides.

Examples of metal substrates include metal substrates selected from copper, alclad aluminum, anodized aluminum, galvanized steel, cold-rolled steel, cast aluminum, and cast magnesium.

Examples of cellulose substrates include paper, cardboard, wood.

Examples of textile substrates include natural or synthetic knit, woven or non-woven fabric made of materials such as cotton, polyamide, wool, nylon, polyester.

Such composite parts include those constructions where any of a plastic substrate or thermoplastic substrate and a silicone rubber are used as an integral component.

Examples of such composite parts can be found in various industries including, but not limited to, automotive applications, medical applications, consumer and industrial applications, electronic applications. In automotive applications, this may include housings with a silicone seal or gasket, plugs and connectors, components of various sensors, membranes, diaphragms, climate venting components, and the like. In medical applications composite parts may be used in devices such as masks, goggles, tubing and valves catheters, ostomy appliances, respiratory appliances, feeding appliances, contact lenses, hearing aids, orthotics, prosthesis, and the like. In consumer and industrial applications composite parts may be found in shower heads, bakery ware, spatulas, home appliances, shoes, goggles, sports and leisure articles, diving masks, face masks, pacifiers and other baby articles, feeding accessories, seals and surfaces of white good and other kitchen articles, and the like. Electronic applications may include mobile phone cover seal, mobile phone accessories, precision electronic equipment, electrical switches and switch covers, watches and wristbands, wearable electronic devices, and the like.

The curable liquid silicone rubber composition may be applied to the surface of the substrate by any suitable means such as rolling, spreading, spraying, and the like, and cured as required.

When the curable liquid silicone elastomer composition is used for textile coating, such as airbag coating, the curable composition (resulting from mixing part A and part B compositions) may be applied by any coating technique, including roller application, curtain coating, spray coating, knife coating or calendering.

The present invention relates to the use of a primary mass flow meter in an in liquid silicone rubber composition manufacturing assembly.

The present invention relates to a method for controlling flow in an extruder assembly by providing for a mass flow meter in liquid silicone rubber composition manufacturing assembly for the production of a liquid silicone rubber composition.

Figure 2:
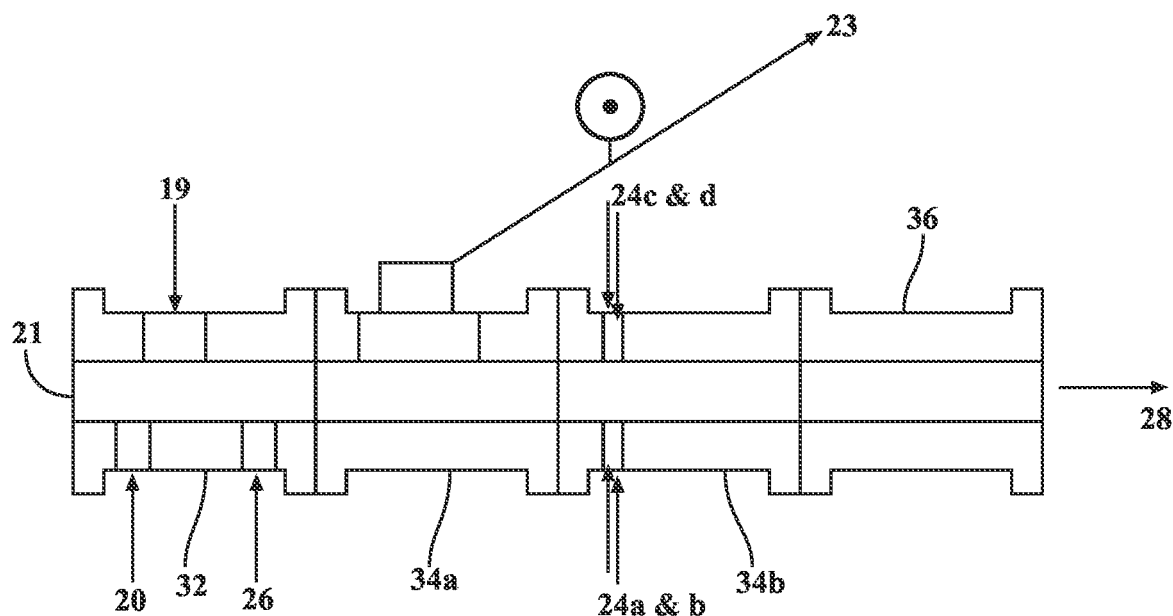
FIG. 2 is a cross-sectional drawing of one option for an extruder for use herein.

The invention will now be described by way of example and with reference to the accompanying drawings in which FIG. 1 is a schematic view of an extruder assembly as described herein, and FIG. 2 is a cross-sectional drawing of one option for an extruder for use herein Referring to FIG. 1, there is provided a preconditioning assembly (10), a gear pump (12), a screen changer (14), a primary mass flow meter (16) and a twin screw extruder (18). Silicone rubber base material is prepared in preconditioning assembly (10) by mixing the ingredients thereof, typically liquid alkenyl-containing polydiorganosiloxane polymer(s) (A') and reinforcing fillers (C), e.g. silica. Typically the filler has been pre-treated to be hydrophobic or is rendered hydrophobic by the introduction of in situ treating agent to render the silica filler hydrophobic and thereby easier to mix into the polymer (A'). Once prepared the silicone rubber base material is transported to and from gear pump (12) and into screen changer (14). Screen changer (14) is designed to filter the silicone rubber base material to remove outsized filler particles and any other particulate waste above a specified size or the like from the silicone rubber base material. Subsequent to screening the Silicone rubber base material is transported through primary mass flow meter (16) and subsequently into the twin screw extruder (18) by way of the first introduction port (19).

Three additive introduction ports are depicted in FIGS. 1, (20, 22 and 24). A non-differential material e.g. additional polymer might, for example, be introduced from introduction port (20). In the case of making a part A composition, a catalyst or catalyst masterbatch/concentrate part may be introduced through introduction port (22) and colouring agents or pigments or the like may be introduced via introduction port (24). If a part B composition is being prepared a cross-linker or cross-linker masterbatch may be introduced at additional introduction port (22) (differential material). The cross-linker/cross-linker masterbatch might also include inhibitor or inhibitor (both differential materials), if present might be added via addition port (24). In each case materials added into the mainstream of silicone rubber base material in the main barrels of extruder (18) are thoroughly mixed and de-aired whilst travelling therethrough. After processing in the twin screw extruder (18) the resulting final product leaves the extruder through outlet (28) and is transported to the packaging unit (30) for packing and storing. Whilst only a single packaging unit (30) is shown there may be provided a switch or series of valves or the like at outlet (28) controlled by the control unit and a series of dedicated packaging units (30) may be provided i.e. one for each product or type of product. Furthermore there may also be a switch/series of valves which may be controlled by the control unit to transfer final product which has been determined to be outside the required specification which is transferred to waste.

Referring now to FIG. 2 which is a more detailed depiction of twin screw extruder (18) having a first introduction port (19) for introducing silicone rubber base material into the extruder (18) Additional polymer might for example be introduced from additional introduction ports (20 & 22) as these are non-differential ingredients, a catalyst or catalyst masterbatch might be introduced from one of ports (24a-d) when preparing a part A composition. Alternatively when a part B composition is being prepared then cross-linker and inhibitor may be introduced through one or two additional ports 24a-24d. Additives such as colouring agents or pigments or the like may be introduced via other additional introduction ports 24a to d. FIG. 2 is depicting a twin screw extruder having three sections made up from four barrels. The first section is identified as (32), the second is made up of two barrels (34a) and (34b) and the third is 36. Three introduction ports are provided in the first section, the first introduction port (10) for the introduction of silicone rubber base material and two additional introduction ports (20 and 22) are provided for e.g. the introduction of non-differential materials e.g. additional polymer. A vacuum (23) is applied in the first barrel part of the second portion (34a), and additional introduction ports (24a,b,c or d) in the second part of the second section (34b) for the introduction of differential materials such as catalyst (D) when making a part B composition or crosslinker (B') and inhibitor (E) when making a part B composition. The second part of the second section remains under vacuum. The third section (36) is provided for increasing pressure and mixing the differential ingredients introduced in section 2 into the composition. Co-rotative twin screw (21) is utilised to transport the ingredients added into the extruder device through introduction ports (19), (20), (22), and (24a,b,c,d) towards outlet (28) from which the final composition is transferred to the packaging assembly.

The mass flow of silicone rubber base material passing through primary mass flow meter (16) is monitored by a control unit (not shown) and whilst it is maintained within a predefined specified range the control unit maintains the standard rates of introduction of uncured silicone base material through first introduction port (19) and the predetermined standard rates of introduction of additional ingredients through any functional additional introduction ports, (20), (26), and (24a,b,c,d). Likewise, the vacuum applied in the first part of the second head (34a) is maintained at the standard rate. However, if mass flow readings from the primary mass flow meter (16) go outside the predefined specified range, i.e. below the minimum or above the maximum, the control unit calculates and signals compensating rates of addition of additives to the additional introduction ports in use, e.g. one or more of (20), (26), and (24a,b,c,d).

The control unit is also adapted to determine deviations outside pre-defined tolerances in relative quantities of ingredients and/or time periods when the composition exiting the extruder through outlet (28) does not meet a targeted product composition to provide alarms. Such deviations causes an alarm (not shown) to be triggered to notify an operator of potential quality control issues. The alarms are utilised to trigger predefined corrective actions, such as prevention of composition not meeting a targeted product composition being supplied to the packaging unit. This is dealt with by diverting non-conforming product exiting through outlet (28) by way of one or more valves positioned at the outlet of the extruder to waste and/or in extreme circumstances shutting down the process.

The control unit may also monitor flow rate of the silicone rubber base materials being transported through primary mass flow meter (16) from the preconditioning assembly (10) to maintain a pre-determined minimum flow, to ensure optimum operational accuracy of the primary mass flow meter (16).

The following examples further illustrate the process as described herein

EXAMPLES

Example 1: Preparation of a Liquid Silicone Rubber for High Voltage Insulators Application The ingredients of a silicone rubber base material, a liquid polydiorganosiloxane containing at least two silicon-bonded alkenyl groups per molecule and silica filler were compounded in a preconditioning assembly mixer. The resulting silicone rubber base material was moved through a Maag gear pump, of 2" dimension, with a rated discharge pressure of 133 bar (13,300 kPa), at a working temperature ranging of from 20 to 130° C.

The screen changer following the gear pump may operate at a pressure of from 20 to 130 bar (13,000 kPa), with a design pressure of 155 bar (15,500 kPa), for a flow rate of 300 to 1037 kg/hr, at a working temperature ranging of from 20 to 130° C.

The silicone rubber base material was then transferred to a primary mass flow meter from Emerson, type CMF200, having an accuracy >99.5%, with a design pressure of about 40 bar (4000 kPa) and the mass flow of the silicone rubber base material through the primary mass flow meter was monitored and as and when the mass flow went outside required limits the control unit caused compensating changes in mass flow to be carried out by the additional introduction means.

The silicone rubber base material was then transferred to an extruder device having 3 sections, comprising 5 longitudinally connected barrels. The pressure in the extruder may range from full vacuum to 40 bar (4000 kPa). The first barrel is provided with 2 introduction ports, one for main feeding, and one for spare. The second barrel has 1 introduction port, connected with the vacuum line and pressure transmitter. The third barrel is provided with 3 introduction ports for different additives feeding like cross-linker or pigment or mixture determined by formulation. The mass flow of the silicone rubber base material (intermediate composition) was constantly monitored and compensating rates of introduction were applied to the additional introduction ports when the mass flow of silicone rubber base material strayed outside the predefined range.

A 2" diameter hose (about 5 cm) was connected at the outlet of the extruder, driving the resulting composition to a packaging assembly for deposition into a 200 L open top drum.

The apparatus and process used above provided was able to make both parts A and B of a liquid silicone rubber composition which when cured can be utilised for high voltage insulators application, with color options of grey and clear. The viscosity of the final compositions range from 180 to 320 Pa·s at 25° C., at a shear rate of 10 l/s using a plate plate rheometer.

Example 2: Preparation of a Liquid Silicone Rubber for Automotive Application

A preconditioning assembly was filled with raw materials including alkenyl functional siloxane and silica filler. The resulting silicone rubber base material was moved through a Maag gear pump, of 2" dimension, with a rated discharge pressure of 133 bar (13,300 kPa), at a working temperature ranging of from 20 to 130° C.

The screen changer following the gear pump may operate at a pressure of from 20 to 130 bar (13,000 kPa), with a design pressure of 155 bar (15,500 kPa), for a flow rate of 300 to 1037 kg/hr, at a working temperature ranging of from 20 to 130° C.

The silicone rubber base material was then transferred to a primary mass flow meter from Emerson, type CMF200, having an accuracy >99.5%, with a design pressure of about 40 bar and the mass flow of the silicone rubber base material through the primary mass flow meter was monitored and as and when the mass flow went outside required limits the control unit caused compensating changes in mass flow to be carried out by the additional introduction means being utilised to introduce other materials into the extruder.

The silicone rubber base material was then transferred to an extruder, having 4 barrels which were split into 3 sections. The pressure in the extruder may range from full vacuum to 40 bar (4000 kPa). The first section is provided with 3 introduction ports, one for main and 2 additional feed lines that are fed from 2 separate bulk tank and header systems. The second section contained two barrels the first containing a vacuum line and pressure transmitter and the second (while remaining under vacuum) has two additional introduction ports, The third barrel is provided with 2 introduction ports for differential ingredient addition, such that when making a part A composition, catalyst or a catalyst masterbatch is introduced and when making a part B formulation cross-linker and, if required inhibitor are introduced. The number of materials capable of being fed through these ports are limitless as they are fed from a container size ranging from drum to an intermediate bulk container. The last barrel is set to finalize the mixing. The flow rate of the silicone rubber base material will be monitored for quality and the system will have an automated shut down or self-correct if a specified quality parameter is not met.

A hose is connected at the outlet of the extruder, driving the final composition in open top drums and intermediate bulk containers.

The apparatus and process used above produce parts A and B of a liquid silicone rubber for the automotive markets by changing the ingredients introduced via the addition introduction ports in the second half of the second section of the extruder (third barrel). The viscosity of the final compositions range of from 5 to 130 Pa·s at 25° C., 10 l/s at a shear rate of 10 l/s using a plate plate rheometer. The variation from the process was found to be improved relative to a reference process (batch) by a factor of 1.3 or better.

Example 3: Preparation of a Liquid Silicone Rubber for Subsea Pipework Insulation and Mouldmaking/Replication A preconditioning assembly was filled with raw materials including Vinyl-endcapped PDMS (45%, viscosity range 5 to 55 Pa.$), in situ treated silica (20%, ~400 m²/g BET) and siloxane based fluid (5%, 5 Pa.$). The resulting silicone rubber base material was moved through a Maag gear pump, of 2" dimension, with a rated discharge pressure of 133 bar (13,300 kPa), at a working temperature ranging of from 20 to 130° C.

The screen changer following the gear pump may operate at a pressure of from 20 to 60 bar (6000 kPa), with a design pressure of 130 bar (13,000 kPa), for a flow rate of 300 to 1037 kg/hr, at a working temperature ranging of from 20 to 130° C.

The silicone rubber base material was then transferred to a primary mass flow meter from Emerson, type CMF200, having an accuracy >99.5%, with a design pressure of about 40 bar (4000 kPa) and the mass flow of the silicone rubber base material through the primary mass flow meter was monitored and as and when the mass flow went outside required limits the control unit caused compensating changes in mass flow to be carried out by the additional introduction means being utilised to introduce other materials into the extruder.

The silicone rubber base material was then transferred to the extruder (56 mm), having 4 barrels but divided into 3 sections. The pressure in the extruder may range from full vacuum to 12 bar (1200 kPa). The extruder is 30 bar (3000 kPa) rated. The first section is provided with 3 introduction ports, one for main feeding (~75% of total throughput), one used for an additional feed of siloxane fluid (~20%, 5 Pa·s), and one for spare. The second section comprised two barrels. The first barrel in the second section was utilised to draw a vacuum to enable the removal of air and bubbles and was also connected to a pressure transmitter to monitor pressure change. The second part of the second section remained under vacuum and was provided with 2 additional introduction ports for introducing differential ingredients such as catalyst when making part A and cross-linker and inhibitor for part B. Additives such as e.g. dyes or pigments were also added in the second section through additional introduction ports as and when required.

A 2" hose is connected through a non-return valve and with a separation valve (used during start up) at the outlet of the extruder, driving the final composition in a 200 L open top drum.

The apparatus and process used above provided for part A (base) of a liquid silicone rubber for subsea pipework insulation and mouldmaking/replication, with color options of yellow and clear. The viscosity of the final compositions ranges from 70 to 100 Pa·s at 25° C., at a shear rate of 10 l/s using a plate plate rheometer. It was found that the variation from the process was found to be improved relative to a reference process (batch) by a factor of 1.3 or better.

The invention claimed is:

1. A liquid silicone rubber composition manufacturing assembly, the manufacturing assembly sequentially comprising:
    (i) a preconditioning assembly for the preparation of a silicone rubber base material;
    (ii) a primary mass flow meter;
    (iii) an extruder device, having a first introduction port adapted for the introduction of silicone rubber base material generated in the preconditioning assembly (i), at least one additional introduction port, and an outlet;
    (iv) a packaging assembly; and
    additionally comprising:
    (v) a control unit adapted to receive mass flow information on silicone rubber base material passing through the primary mass flow meter (ii) from the preconditioning assembly (i), to detect any variation from a predetermined mass flow range of values and to compute and control a compensating rate of introduction of the silicone rubber base material into the extruder device (iii) and/or compensating rate(s) of introduction of additional components through the at least one additional introduction port downstream of the first introduction port in the extruder device (iii).

2. The manufacturing assembly of claim 1, wherein the preconditioning assembly (i) is a compounder for making a silicone rubber base material.

3. The manufacturing assembly of claim 1, wherein the primary mass flow meter (ii) is based on a Coriolis principle.

4. The manufacturing assembly of claim 1, wherein the control unit (v) additionally monitors and identifies deviations outside pre-defined tolerances in relative quantities of ingredients and/or time periods when a composition exiting the extruder device (iii) does not meet a targeted product composition.

5. The manufacturing assembly of claim 1, wherein the control unit (v) additionally monitors for and identifies deviations in flow in one or more of the introduction ports compared to predefined target ranges and is also adapted to trigger and/or generate signals/alarms to cause compensating changes in flow rate therein.

6. The manufacturing assembly of claim 1, wherein a length/diameter (L/D) ratio of the extruder device (iii) is a value of from 12 to 30.

7. The manufacturing assembly of claim 1, wherein each additional introduction port is adapted for varying the rate of introduction of its respective ingredient and/or additive into the extruder device (iii) and is able to provide and receive information from the control unit (v).

8. The manufacturing assembly of claim 1, wherein the extruder device (iii) comprises at least three sections and/or barrels along its length between the introduction port and the outlet.

9. The manufacturing assembly of claim 1, wherein the packaging assembly (iv) includes hoses, valves, and fixed and/or removable containers.

10. A process for the production of liquid silicone rubber compositions, the process comprising the step of providing the manufacturing assembly of claim 1.

11. The process in accordance with claim 10, comprising the steps of:
 a) making a silicone rubber base composition in the preconditioning assembly (i);
 b) transferring the silicone rubber base composition from the preconditioning assembly (i) through the primary mass flow meter (ii) and into the extruder device (iii), optionally, introducing additives into the silicone rubber base material being transported through the extruder device (iii) by way of the at least one additional introduction port(s);
 c) controlling the mass flow of the silicone rubber base material, and optionally additives, in the extruder device (iii) by way of the control unit (v);
 d) mixing the silicone rubber base material, and optionally additives, in the extruder device (iii) to make a final composition; and
 e) conveying the final composition from the outlet of the extruder device (iii) to the packaging assembly (iv).

12. The process in accordance with claim 11, wherein the control unit (v):
 i) detects any variation from a predetermined mass flow range of the silicone rubber base material when passing through the primary mass flow meter (ii) and if required, computes and controls a compensating rate of introduction of the silicone rubber base material into the extruder device (iii) via the first introduction port and/or the introduction rate(s) of additional components from the at least one additional introduction port(s) in the extruder device (iii);
 ii) monitors and identifies deviations outside pre-defined tolerances in relative quantities of ingredients and/or time periods when a composition exiting the extruder device (iii) does not meet a targeted product composition;
 iii) monitors for and identifies deviations in flow in one or more of the introduction ports compared to predefined target ranges and triggers and/or generates signals/alarms to cause compensating changes in flow rate therein;
 iv) monitors flow rate of the silicone rubber base materials being transported through the primary mass flow meter (ii) from the preconditioning assembly (i) to maintain a pre-determined minimum flow to ensure operational accuracy of the primary mass flow meter (ii); or
 v) any combination of two or more of i) to iv).

13. The process in accordance with claim 11, wherein silicone base material and catalyst are mixed to provide a part A composition.

14. The process in accordance with claim 11, wherein silicone rubber base material and cross-linker and optionally inhibitor are mixed to provide a part B composition.

15. The manufacturing assembly of claim 1, wherein the control unit (v) detects any variation from a predetermined mass flow range of the silicone rubber base material when passing through the primary mass flow meter (ii) and if required, computes and controls a compensating rate of introduction of the silicone rubber base material into the extruder device (iii) via the first introduction port and/or the introduction rate(s) of additional components from the at least one additional introduction port(s) in the extruder device (iii).

16. The manufacturing assembly of claim 1, wherein the primary mass flow meter (ii) accounts for density variability when providing mass flow information to the control unit (v).

17. The manufacturing assembly of claim 1, wherein the extruder device (iii) is a twin screw extruder.

18. The manufacturing assembly of claim 1, wherein the manufacturing assembly further comprises, between the preconditioning assembly (i) and the primary mass flow meter (ii):
 a) a screen changer;
 b) a gear pump; or
 c) both a) and b).

19. The manufacturing assembly of claim 18, wherein the manufacturing assembly comprises the screen changer between the preconditioning assembly (i) and the primary mass flow meter (ii).

20. The manufacturing assembly of claim 18, wherein the manufacturing assembly comprises the gear pump between the preconditioning assembly (i) and the primary mass flow meter (ii).

* * * * *